(12) United States Patent
Cherniski et al.

(10) Patent No.: US 7,049,796 B2
(45) Date of Patent: May 23, 2006

(54) HOT SWAP POWER DELIVERY CIRCUIT

(75) Inventors: A. Michael Cherniski, Rescue, CA (US); James K. Koch, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 480 days.

(21) Appl. No.: 10/346,971

(22) Filed: Jan. 17, 2003

(65) Prior Publication Data

US 2004/0177201 A1   Sep. 9, 2004

(51) Int. Cl.
*G05F 1/40* (2006.01)
*G05F 1/56* (2006.01)

(52) U.S. Cl. .................. 323/271; 323/273
(58) Field of Classification Search .......... 323/242, 323/165, 268, 271, 282, 285, 288; 327/403, 327/404, 419, 427
See application file for complete search history.

(56) References Cited

U.S. PATENT DOCUMENTS

| 5,758,102 | A |   | 5/1998  | Carey et al.    |         |
|-----------|---|---|---------|-----------------|---------|
| 5,789,964 | A | * | 8/1998  | Voldman         | 327/380 |
| 6,151,223 | A | * | 11/2000 | Tamura et al.   | 363/19  |
| 6,172,549 | B1| * | 1/2001  | Gilbert         | 327/349 |
| 6,339,349 | B1| * | 1/2002  | Rajagopalan     | 327/131 |
| 6,437,612 | B1| * | 8/2002  | Dasgupta et al. | 327/108 |
| 6,590,439 | B1| * | 7/2003  | Larson          | 327/363 |

FOREIGN PATENT DOCUMENTS

JP        63257420       10/1988

* cited by examiner

Primary Examiner—Matthew V. Nguyen

(57) ABSTRACT

A hot swap power delivery circuit. Specifically, the hot swap power delivery circuit is used for controlling current to a load. The hot swap power delivery circuit comprises a field effect transistor (FET), a ramp circuit, and a source follower feedback circuit. The FET comprises a gate, a source, and a drain. The ramp circuit is coupled to the gate of the FET, and is used for delivering current to a load that is coupled to the source of the FET. The source follower feedback circuit is coupled to the source and the gate and is used for de-linearizing an output voltage on said source affecting the delivery of the current.

20 Claims, 3 Drawing Sheets

HOT SWAP POWER DELIVERY CIRCUIT

TECHNICAL FIELD

The various embodiments of the present invention relate to the delivery of power to subsystems with plug-in and add-on capabilities through a passive backplane architecture. Specifically, various embodiments of the present invention relate to a hot swap power delivery circuit that controls the delivery of power to subsystems with plug-in and add-on capabilities.

BACKGROUND ART

A passive backplane architecture allows for the flexibility to swap in and out various subsystems with plug-in and add-on capabilities in a personal computer (PC). The passive-backplane architecture is comprised of a system bus used to interconnect a plug-in subsystem that is a processor and multiple plug-in subsystems with added functionality. This architecture allows the flexibility to add or swap various plug-in subsystems for system repairs, changes, and upgrades with minimum resulting system downtime.

Many systems rely on a local bus system that supports the passive-backplane architecture. For example, a Peripheral Component Interconnect (PCI) local bus has sufficient bandwidth to offer the throughput demanded by the latest PCs, input/output (I/O) devices, and storage devices.

However, the use of PCI as the local bus introduces issues of vendor interoperability and standards. As such, a group of industrial computer product vendors established the PCI Industrial Computer Manufacturers Group (PICMG) to define standards for industrial passive-backplanes that follow the PCI and Industry Standard Architecture (ISA) standards, as well as the central processing unit (CPU) card interface specification. As a result, a comprehensive specification and standard for the passive-backplane architecture was generated that supported both the PCI and ISA input/output (I/O) buses.

One of the issues addressed by the PICMG II standard is hot swapping of plug-in subsystems to the passive backplane architecture. Hot swapping refers to the ability of a subsystem (e.g., a plug-in board) to be removed-from or added-to a host system while the host is fully functional and powered. The biggest challenge in hot swapping occurs when the un-powered subsystem is first inserted into the powered host system. The hot swap activity must not adversely perturb the host power system or otherwise impact other components on the host system.

Hot swap issues arise when discharged storage and bypass capacitors on the hot swapped subsystem must be charged by the host power system. A maximum current rate of change (di/dt) must not be exceeded during this event. For example, the PICMG II standard for low voltage rails on plug-in subsystems specifies that the maximum current rate of change (di/dt) must not exceed 1.5 A/ms.

However, conventional ramp circuits, or voltage regulators implemented on controller chips that deliver power to the plug-in subsystem currently violate the PICMG II current rate of change (di/dt) standard. These conventional ramp circuits implement a pass field effect transistor (FET) that delivers current to the plug-in subsystem, as a load, from a host system.

Prior Art FIG. 1A is a chart 100A illustrating the rate of voltage versus time for an output of the FET in the conventional ramp circuit. The output is coupled to the plug-in subsystem, or load. As seen in Prior Art FIG. 1A, the voltage ramps up from 0 volts to another voltage (e.g., −12 to +12 volts) on a linear ramp once the plug-in subsystem demands power.

In one example, at voltage transition A-110, the voltage seen at the output of the conventional ramp circuit sharply transitions from 0 volts to a positive slope m-115. The voltage ramps up at the slope m-115 until an abrupt transition occurs at the voltage transition B-120. The ramp time between the two transitions typically occurs in the millisecond range, e.g., 20 ms.

At transition B-120, the voltage abruptly transitions from a linear ramp with slope m-115 to a constant 5 volts. These two voltage transitions A-110 and B-120 are the regions where the PICMG II standard for the maximum current rate of change (di/dt) is violated, as will be shown later.

Prior Art FIG. 1B is a chart 100B illustrating the corresponding voltage rate of change (dv/dt) on the output of the conventional ramp circuit. The voltage rate of change is a square wave with a maximum value as determined from Prior Art FIG. 1A of (5 volts/20 ms).

The current affecting the output of the conventional ramp circuit is directly related to the voltage rate of change (dv/dt) of Prior Art FIG. 1B. The current in the output is a constant value times the voltage rate of change (dv/dt). The constant value is the total bypass capacitance associated plug-in subsystem, or load.

If the bypass capacitance is large and/or the voltage rate of change is large, then the current drawn from the backplane power supply by the conventional ramp circuit may violate current specification requirements (e.g., current amplitude or current rate of change). Prior Art FIG. 1C is a chart 100C illustrating the current rate of change (di/dt) affecting the output of the conventional ramp circuit.

The PICMG II standard for the maximum current rate of change (di/dt) can be violated in two regions associated with voltage transition A-110 and voltage transition B-120 of the conventional ramp circuit. In Prior Art FIG. 3C, the current rate of change spikes to a large positive value approaching infinity when associated with the abrupt voltage transition seen at A-110. Similarly, the current rate of change spikes to a large negative number approaching negative infinity when associated with the voltage transition seen at B-120. As a result, these two spikes show that the conventional ramp circuit violates the PICMG II standard of maximum current rate of change.

One prior art solution uses a very large capacitor in the conventional ramp circuit. The large capacitor is used to decrease the voltage ramp rate through the output of the conventional ramp circuit in order to comply with the PICMG II standard maximum current rate of change. This very large capacitor increases the overall length of the voltage ramp which helps to accommodate PICMG II standards. However, the voltage on the output of the conventional ramp circuit remains linear for a longer period of time than necessary. As such, the conventional ramp circuit can overheat. A heat sink and oversized FET used to solve the overheating in the conventional art is too costly both in terms of monetary cost and physical space required, rendering this solution inadequate.

Another prior art approach uses an active control loop that provides a true current source with a linearly increasing current value over the ramp duration. This approach works well to flatten out the current rate of change (di/dt) characteristics during the ramp duration when used with a static resistive load. When driving a static resistive load, the ramp duration is predictable and fully optimized from a FET energy perspective. However, real-life circuitry consists of semiconductors and constant power converters that can have negative resistance characteristics when ramping. This can result in unpredictable ramp times, excessive FET power dissipations, and unrecoverable circuit latching. Additionally, this approach is much more complex and requires a sense resistor and consideration for loop damping.

DISCLOSURE OF THE INVENTION

A hot swap power delivery circuit is disclosed. Specifically, the hot swap power delivery circuit is used for controlling current to a load. The hot swap power delivery circuit comprises a field effect transistor (FET), a ramp circuit, and a source follower feedback circuit. The FET comprises a gate, a source, and a drain. The ramp circuit is coupled to the gate of the FET, and is used for delivering current to a load that is coupled to the source of the FET. The source follower feedback circuit is coupled to the source and the gate and is used for de-linearizing an output voltage waveform affecting the delivery of the current.

BRIEF DESCRIPTION OF THE DRAWINGS

The above and other objects and advantages of the present invention will be more readily appreciated from the following detailed description when read in conjunction with the accompanying drawings, wherein.

PRIOR ART

PRIOR ART

PRIOR ART

BEST MODES FOR CARRYING OUT THE INVENTION

Reference will now be made in detail to embodiments of the present invention, a hot swap power deliver circuit, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Accordingly, embodiments of the present invention provide a hot swap power delivery circuit that facilitate control of both magnitude and rate of change of inrush current during a hot swap event. As a result, other embodiments of the present invention serve the above purpose and provide for the reduction of the transition time for hot swapping a plug-in subsystem, which results in minimizing pass transistor power dissipation energy. This leads to more compact and more efficient hot swap circuits.

Embodiments of the present invention are well suited to addressing the current control specifications required in the PCI Industrial Computer Manufacturers Group (PICMG) standard, its derivatives, and other standards. Other embodiments are well suited to meeting any predetermined maximum current magnitude and rate of change required for any ramping circuit.

Figure 1A:
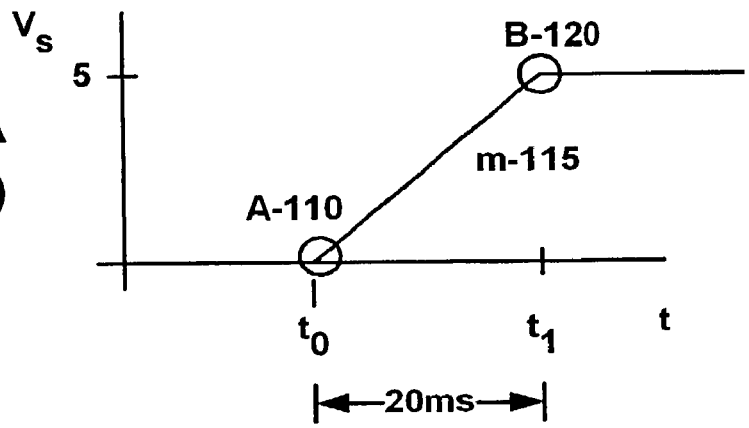
FIG. 1A is a chart illustrating the rate of voltage versus time on a source of a field effect transistor (FET) used for delivering power in the linear region.
Figure 1B:
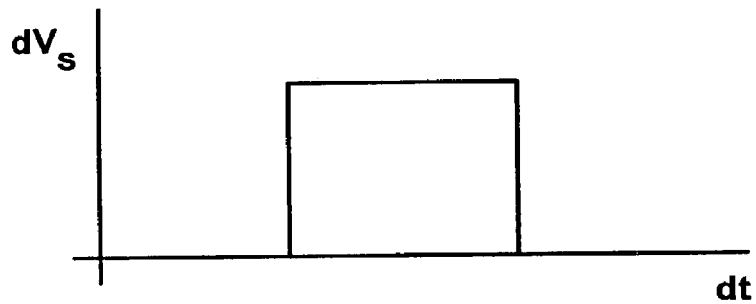
FIG. 1B is a chart illustrating the first derivative of voltage versus time of the diagram of Prior Art FIG. 1A.
Figure 1C:
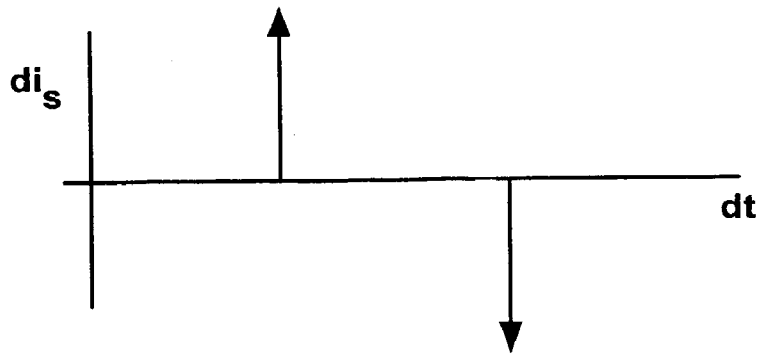
FIG. 1C is a chart illustrating the first derivative of current versus time affecting the source of the FET of Prior Art FIG. 1A.
Figure 2:
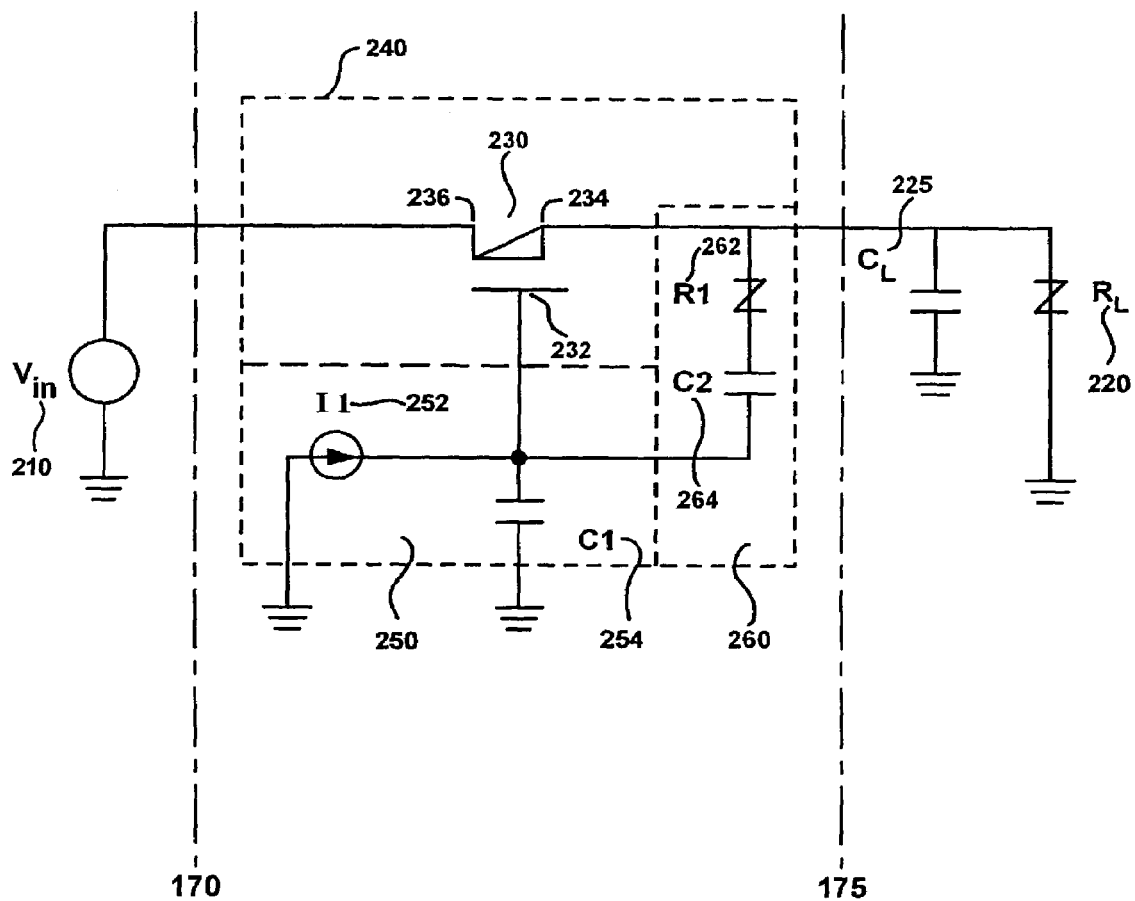
FIG. 2 is a circuit diagram illustrating a hot swap power delivery circuit for controlling current to a load, in accordance with one embodiment of the present invention.

Referring now to FIG. 2, a circuit diagram 200 illustrates a hot swap power delivery circuit as integrated with a passive-backplane architecture, in accordance with one embodiment of the present invention. The passive backplane architecture allows for the flexibility to swap in and out various plug-in add-on subsystems in an electronic system (e.g., a personal computer). The term plug-in add-on systems are also known as boards, blades, or hot swappable modules to those well versed in the art. This architecture allows the flexibility to add or swap various plug-in subsystems for system repairs, changes, and upgrades with minimum resulting system downtime.

In the present embodiment, the hot swap power delivery circuit 240 is comprised of a field effect transistor (FET) 230, a ramp circuit 250, and a source follower feedback circuit 260. The hot swap power delivery circuit 240 employs a power field effect transistor (FET) 230 in a source-follower configuration to deliver power from the host power source $V_{in}$ 210 to the subsystem load $R_L$ 220 and subsystem load capacitor $C_L$ 225. In one case, the subsystem load capacitor CL is a bypass capacitor. The FET acts as an inrush current limiter. The subsystem load $R_L$ 220 and subsystem bypass capacitor $C_L$ 225 are coupled in parallel to the source 234 and to ground.

The FET is comprised of a gate 232, a source 234, and a drain 236. Since the FET is configured as a source follower, the voltage of the source 234 follows the voltage on the gate 232. It is necessary to select a large enough FET such that the FET is maintained in its safe operating power range. In one embodiment, the FET is an n-channel metal oxide semiconductor FET (NMOS), as shown in FIG. 2. Other embodiments are well suited to ramping circuits comprised of p-channel FETs.

The ramp circuit 250 is coupled to the gate 232 and is used for controlling current to the subsystem load $R_L$ 220 and subsystem capacitor $C_L$ 225. The ramp circuit 250 drives the gate 232 of the FET 230 in a non-linear fashion so that the energy supplied to the bypass capacitors $C_L$ 225 is delivered slowly, over time.

In one embodiment, the ramp circuit 250 is comprised of a direct current (DC) current source I1 252 that drives a single capacitor C1 254. The current source I1 252 and the capacitor C1 254 are coupled in parallel to the gate 232 of the FET 230 and to ground.

The hot swap power delivery circuit 240 further comprises a source follow feedback circuit 260. In one embodiment, the source follower feedback circuit 260 is comprised solely of the capacitor C2 264 that is coupled to the source 234 and gate 232 of the FET.

In another embodiment, the source follower feedback circuit 260 is comprised of an optional resistor R1 262 that is coupled in series with the capacitor C2 264. In this case, the optional resistor R1 262 is coupled to the source 234 of the FET and to the capacitor C2 264. Furthermore, in this embodiment, the capacitor C2 264 is coupled to the gate 232 of the FET.

The optional resistor R1 262 minimizes the time for the source follower feedback circuit to smooth the transitions into and out of a non-linear ramp of current as delivered to the load, as shown in transition A-333 and transition B-335 of FIG. 3A, as will be more fully described later. In short, at transition A-333, the current in R1 262 helps to sustain the offset voltage between the gate 232 and the source 234 providing an initial offset voltage. As a result, the resistor R1 262 limits the effect of the capacitor C2 264 on the hot swap power delivery circuit 240. In short, when the current is large, as in transition A-333 and transition B-335, the voltage across R1 is significant and capacitor C2 264 is de-coupled from the hot swap power delivery circuit 240. On the other hand, when the current is small, especially at the beginning and end of the ramp, the voltage across R1 is more insignificant and capacitor C2 264 is coupled into the hot swap power delivery circuit 240. In effect, the resistor R1 262 helps to speed the transition of the hot swap power deliver circuit 240 into and out of the non-linear ramp region.

The present embodiment adds two passive components in order to shape the voltage on the gate and source of the FET 230 and reduce the current rate of change (di/dt) as seen by the host power system $V_{in}$ 210. The passive components include the optional resistor R1 262 and the capacitor C2 264. The resistor/capacitor (RC) combination of optional R1 262 and the capacitor C2 264 provide a modification current to the ramp circuit 250 that causes the ramp to develop more or less a non-linear S-shape rather than the conventional linear ramp. More specifically, from the alternating current (AC) perspective, because the source 234 is coupled to the gate 232, the resistor R1 262 and the capacitor C2 264 have no effect on the circuit except when the gate 232 to source 234 voltage is changing. The gate 232 to source 234 voltage is changing most at the beginning and at the end of the ramp.

Embodiments of the present invention are well suited to locating the hot swap power delivery circuit 240 on a plug-in subsystem (e.g., a plug-in board) that includes the load resistor $R_L$ 220 and the bypass capacitor $C_L$ 225. This arrangement is illustrated by dotted line 170, in which, everything to the right of line 170 is the subsystem. As such, the subsystem comprises the FET 230, the ramp circuit 250, the source follower feedback circuit 260, and the load resistor $R_L$ 220 and the bypass capacitor $C_L$ 225.

Other embodiments of the present invention are well suited to locating the hot swap power delivery circuit on the backplane of a host system supplying the power $V_{in}$ 210. This arrangement is illustrated by dotted line 175, in which, everything to the left is the part of the passive backplane architecture. As such, the backplane architecture comprises the FET 230, the ramp circuit 250, the source follower feedback circuit 260, and host power supply $V_{in}$ 210.

Values for the critical components within the hot swap power delivery circuit 240 can be calculated from the following equations. To determine the values for the resistor R1 262 and the capacitor C2 264 in the source follower feedback circuit 260, the ramp time for the hot swap power delivery circuit must be determined. The ramp time designates the time to reach a constant voltage that is delivered to the load resistor 220 and the bypass capacitor $C_L$ 225. The ramp time is calculated as follows in Equation 1.

$$T_R = 4.71[ln(C_L + 194)] - 22.3 \quad (1)$$

In Equation 1, the ramp time ($T_R$) is expressed in milliseconds, and the capacitance for $C_L$ is expressed in microfarads. Equation (1) sets a reasonable compromise between ramp time length and the magnitude of the inrush current.

Once the ramp time ($T_R$) is determined, the value of the capacitor C1 for the ramp circuit 250 is calculated as follows in Equation 2.

$$C1 = [(I1)(T_R)]/[(X)(V_{in})] \quad (2)$$

In Equation 2, I1 is the current value from the current source I1 252. The units for the parameters in Equation 2 are expressed in farads, amps, seconds, and volts.

Moreover, the constant value for X is approximately the square root of 2 ($\sqrt{2}$), in one embodiment of the present invention. This constant X is representative of the effect of capacitor C2 264 on the slope of the voltage ramp seen at the source 234. The constant X can be modified to more clearly represent the effects of capacitor C2 264 in other embodiments.

The value for the capacitance in capacitor C2 264 is equal to the capacitance in capacitor C1 254, in one embodiment.

The value for resistor R1 can then be calculated in Equation 3. The resistance in resistor R1 properly positions the ramp inflection points as reflected at transition A-333 and transition B-335. Equation 3 is calculated as follows:

$$R1 = [(V_T)(T_R)]/[(V_{in})(C1)] \quad (3)$$

In Equation 3, the parameter $V_T$ is the gate threshold voltage on the pass gate 230. The units for the parameters in Equation 3 are expressed in ohms, volts, seconds, and farads.

Figure 3A:
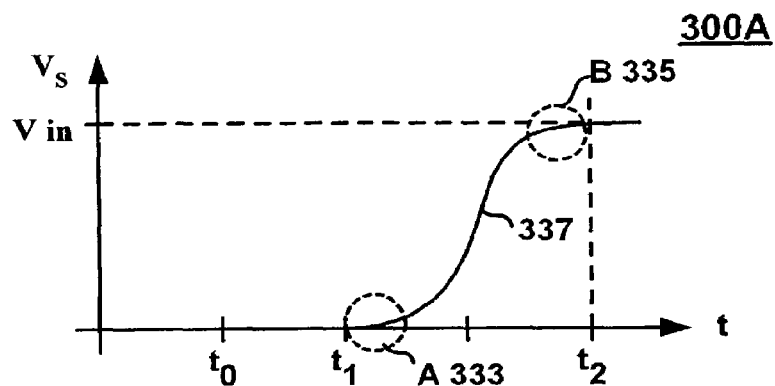
FIG. 3A is a chart illustrating the non-linear change of voltage versus time on a source of a FET of FIG. 2 that is part of a power delivery circuit, in accordance with one embodiment of the present invention.

Referring now to FIG. 3A, a chart illustrating the application of voltage on the source 234 of the FET 230 of the hot swap power delivery circuit 240 is shown, in accordance with one embodiment of the present invention. At time $t_0$ the capacitor C1 254 is fully discharged and coupled to the ground. In addition, the potential on the source 234 of the FET 230 is also at zero potential (0 volts). As such, C2 is also coupled to ground through R1 262. Thus, at time $t_0$ C1 254 is coupled in parallel to C2 with the addition of the R1 262. Most importantly, the voltage rate of change on the gate 232 at $t_0$ occurs at a gradual rate, which de-linearizes the voltage rate of change seen at the gate at time $t_0$.

Specifically, at the beginning of the voltage ramp seen at $t_0$ in FIG. 3A, the voltage on the gate begins to ramp up. However, the FET 230 is not turned on since the threshold voltage of the FET 230 has not been overcome. As such, the voltage on the source 234 is at 0 volts at the beginning of the voltage ramp seen on the gate 232. At this point, the capacitor C2 is effectively grounded because there is no voltage seen on the load resistor $R_L$ 220 and the bypass capacitor $C_L$ 225. As such, capacitors C1 254 and capacitor C2 264 are effectively in parallel forming a large capacitance. As a result, the slope of the voltage ramp seen at the source 234 is low at first. Once the voltage ramp gets beyond the threshold voltage of the FET 230, the voltage on the source 234 ramps up at a higher rate.

At time $t_1$, the voltage on the gate 232 ramps up and reaches the gate 232 to source 234 voltage threshold. Once the voltage threshold is reached, the FET 230 begins to gradually establish a drain 236 to source 234 channel until the channel is saturated. Because the voltage on the gate 232 is ramping up at a gradual non-linear rate, the drain 236 to source 234 channel is also established at a gradual non-linear rate. As such, the voltage on the source 234 also ramps up at a gradual non-linear rate as seen by the load resistor $R_L$ 220 and the load capacitor $C_L$ 225 at transition A-333. As will be fully described later, this slower application of voltage on the source 234 limits the current rate of change (di/dt) in order to comply with current control specifications (e.g., PICMG II).

Once the drain 236 to source 234 channel is fully established in transition A 333, the voltage on the source 234 begins to follow the voltage on the gate 232. Between transition A-333 and B-335, there is no change in voltage between the source 234 and the gate 232 as the FET 230 exhibits its true source follower characteristics. As such, there is no change in voltage across the capacitor C2 264, and C2 264 has limited effect. In this case, the resistor R1 262 and capacitor C2 264 combination become largely isolated from the ramp circuit 250, and the gate 232.

Specifically, the voltage on C2 264 becomes equal to the same voltage as seen on the source 234. As a result, the voltage across the capacitor C2 264 has the same voltage drop between the source 234 and the gate 232, and will not change as long as the FET 230 is within its operational region. This effectively isolates and disconnects the resistor R1 262 and capacitor C2 264 combination from the hot swap power delivery circuit 240.

The ramp of voltage between transition A-333 and transition B-335 occurs at a non-linear rate, as shown by the S-shape of the curve 337. Past transition A-333, the voltage on the source 234 ramps faster since the slope of the ramp is totally dependent on the capacitance of C1 254. However, once the voltage on the source 234 approaches its target voltage value, the voltage on the source 234 begins to ramp at a slower rate. At that point, the FET begins to transition out of the source-follower mode and the resistor R1 262 and capacitor C2 264 combination again interacts with the gate 232. Also, the shape of the curve 337 is dependent on the values chosen for R1 262 and C2 264 and the type of FET 230 implemented in the hot swap power delivery circuit 240.

Specifically, the FET 230 reaches its saturation region. The voltage on the gate 232 continually increases without any limit; however, the voltage on the source 234 begins to be limited by the voltage on the drain 236 because the FET 230 enters the saturation region. Since the voltage on the source 234 is constant, from an alternating current (AC) perspective, C2 264 is again in parallel with C1 254. As such, the capacitor C2 264 and R1 262 comes back into the hot swap power delivery circuit 240 and acts to slow down the voltage ramp in transition B-335, as evidenced by the smooth transition to $V_{in}$ at transition B-335.

Implementation of the source follower feedback circuit 260 causes the voltage on the source 234 to smooth out the transitions when entering and exiting the voltage ramp. The resistor R1 262 and the capacitor C2 269 of the source follower feedback circuit 260 takes advantage of the FET non-linearities to provide smoother transitions at the critical beginning and end of the charge interval providing current to the bypass capacitor $C_L$ 225.

Figure 3B:
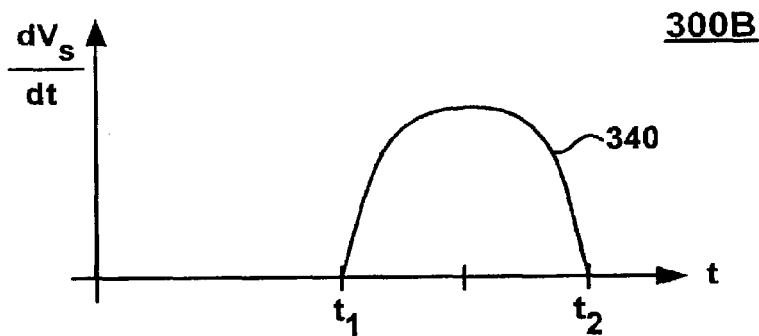
FIG. 3B is a chart illustrating the voltage rate of change versus time affecting a source of the FET of FIG. 2 that is part of a power delivery circuit, in accordance with one embodiment of the present invention.

FIG. 3B is a chart illustrating the voltage rate of change (dv/dt) on the source 234 of the FET 230 of the hot swap power delivery circuit 240, in accordance with one embodiment of the present invention. Because of the smooth transitions when entering and exiting the ramp region at transition A-333 and transition B-335, the voltage rate of change (dv/dt) is no longer a square pulse as exhibited by conventional hot swap power delivery circuits. Instead, the voltage rate of change forms a rounded pulse shape as exhibited by curve 340.

The current affecting the source 234 is directly related to the voltage rate of change (dv/dt) of FIG. 3B. The current in the source 234 is a constant value times the voltage rate of change (dv/dt) of FIG. 3B. The constant value is the total bypass capacitance associated plug-in subsystem.

Figure 3C:
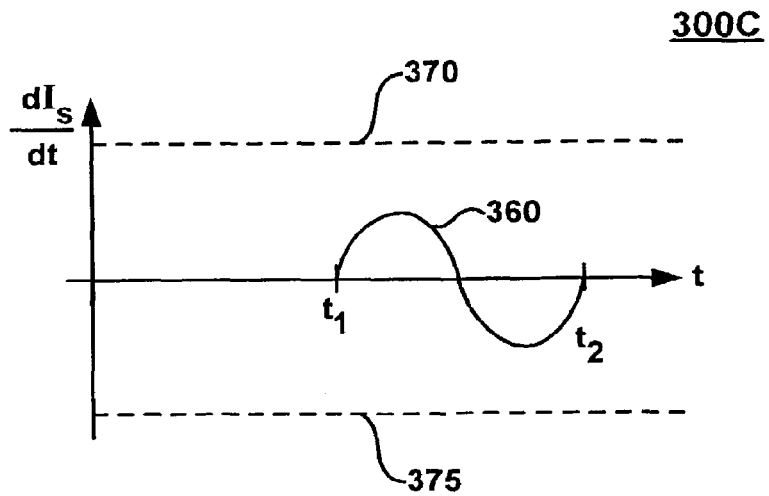
FIG. 3C is a chart illustrating the current rate of change versus time affecting a source of the FET of FIG. 2 that is part of a power delivery circuit, in accordance with one embodiment of the present invention.

FIG. 3C is a chart illustrating the current rate of change (di/dt) over time as seen by the source 234 of the FET 230 of the hot swap power delivery circuit 240. Dotted lines 370 and 375 illustrate a maximum allowable current rate of change (di/dt). The current rate of change (di/dt) of the current at the source 234 between time $t_1$ and $t_2$ as shown in FIG. 3C is represented by curve 360. As shown by the curve 360, the maximum current rate of change (di/dt) falls within the maximum allowable value.

The hot swap power delivery circuit 240 in FIG. 2 flattens the current rate of change (di/dt) characteristics over the voltage ramp duration between transition A-333 and transition B-335 seen at the source 234 of the FET 230. This results in lower current rate of change (di/dt) drawn from the backplane without having to increase the ramp time, which reduces excess heat dissipation in the FET 230. Also, since this hot swap power delivery circuit 240 maintains a low output impedance, the circuit 240 is immune to latch-up when non-linear or negative resistance loads are used. The elegant solution as provided in the hot swap power delivery circuit 240 involves the use of two passive components, resistor R1 262 and capacitor C2 264, to meet current control standards.

A hot swap power delivery circuit is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A hot swap power delivery circuit for controlling current comprising:

a field effect transistor (FET) comprising a gate, a source, and a drain;

a ramp circuit coupled to said gate of said FET for controlling delivery of current to a load that is coupled to said source; and a source follower feedback circuit coupled to said source and said gate for de-linearizing an output voltage on said source affecting said delivery of said current, wherein said source follower feedback circuit comprises a first capacitor coupled on a first side to said source and on a second side to a node, said node coupled to said gate and to a ground through a second capacitor in said ramp circuit.

2. The hot swap power delivery circuit as described in claim 1, wherein said source follower feedback circuit comprises:
said first capacitor coupled in series with a resistor, said resistor coupled on a first end to said source and on a second end to said first side of said first capacitor.

3. The hot swap power delivery circuit as described in claim 1, wherein said ramp circuit comprises:
said second capacitor and a current source coupled in parallel to said node and to said ground, wherein said second capacitor comprises a first side coupled to said node and a second side coupled to said ground.

4. The hot swap power delivery circuit as described in claim 1, wherein said hot swap power delivery circuit is located on a passive backplane architecture isolated from said load, to which said load is coupled to.

5. The hot swap power delivery circuit as described in claim 1, wherein said hot swap power delivery circuit is located on a hot swappable module comprising said load.

6. The hot swap power delivery circuit as described in claim 1, wherein a host power supply is coupled to said source for delivering said current to said load.

7. The hot swap power delivery circuit as described in claim 1, wherein a current change of rate over time does not exceed a Personal Computer Memory Card International Association Industrial Computer Manufacturers Group (PICMG) standard of 1.5 A/ms.

8. A hot swap power delivery circuit for controlling current comprising:
a field effect transistor (FET) comprising a gate, a source, and a drain;
a ramp circuit coupled to said gate of said FET for controlling delivery of current in a ramping fashion from a power supply to a load that is coupled to said source, said power supply coupled to said drain, said ramp circuit comprising a first capacitor and a current source coupled in parallel to a node and to a ground, wherein said node is coupled to said gate;
a source follower feedback circuit for de-linearizing an output voltage on said source affecting said delivery of said current, said source follower feedback circuit comprising second capacitor coupled on a first side to said source and on a second side to said node, wherein said node is coupled to said ground through said first capacitor.

9. The hot swap power delivery circuit as described in claim 8, wherein said source follower feedback circuit further comprises:
a resistor coupled in series with said second capacitor, said resistor coupled on a first end to said source and on a second end to said first side of said second capacitor.

10. The hot swap power delivery circuit as described in claim 9, wherein a resistance for said resistor is equal to a first quantity divided by a second quantity, wherein said first quantity is a threshold voltage of said FET times a ramp time to bring said current in said load to a desired steady state value, and said second quantity is a constant power supply voltage times the capacitance of said first capacitor.

11. The hot swap power delivery circuit as described in claim 8, wherein said first capacitor and said second capacitor have equal capacitance.

12. The hot swap power delivery circuit as described in claim 8, wherein said FET is a power FET.

13. The hot swap power delivery circuit as described in claim 8, wherein a current rate of change over time does not exceed a Personal Computer Memory Card International Association Industrial Computer Manufacturers Group (PICMG) standard of 1.5 A/ms.

14. The hot swap power delivery circuit as described in claim 8, wherein a capacitance for said first capacitance is equal to a first quantity divided by a second quantity, wherein said first quantity is equal to a constant current provided by said current source times a ramp time to bring said current in said load to a desired steady state value, and said second quantity is equal to a constant times a constant power supply voltage, said constant approximately equal to the square root of 2.

15. A hot swap power delivery circuit for controlling current comprising:
a field effect transistor (FET) comprising a gate, a source, and a drain;
a ramp circuit coupled to said gate of said FET for controlling delivery of current to a load from a power supply, said load coupled to said source, said power supply coupled to said drain, said ramp circuit comprising a first capacitor and a current source coupled in parallel to a node and to a ground, wherein said node is coupled to said gate;
a resistor coupled to said source; and
a second capacitor coupled to said resistor and to said node, wherein said node is coupled to said ground through said first capacitor.

16. The hot swap power delivery circuit as described in claim 15, wherein said first capacitor and said second capacitor have equal capacitance.

17. The hot swap power delivery circuit as described in claim 15, wherein said FET is a power FET.

18. The hot swap power delivery circuit as described in claim 15, wherein a current rate of change over time does not exceed a Personal Computer Memory Card International Association Industrial Computer Manufacturers Group (PICMG) standard of 1.5 A/ms.

19. The hot swap power delivery circuit as described in claim 15, wherein said hot swap power delivery circuit is located on a passive backplane architecture isolated from said load.

20. The hot swap power delivery circuit as described in claim 15, wherein said hot swap power delivery circuit is located on a plug-in board comprising said load, said plug-in board coupled to a passive backplane architecture supporting said plug-in board.

* * * * *

UNITED STATES PATENT AND TRADEMARK OFFICE
CERTIFICATE OF CORRECTION

| | | |
|---|---|---|
| PATENT NO. | : 7,049,796 B2 | Page 1 of 1 |
| APPLICATION NO. | : 10/346971 | |
| DATED | : May 23, 2006 | |
| INVENTOR(S) | : A. Michael Cherniski et al. | |

It is certified that error appears in the above-identified patent and that said Letters Patent is hereby corrected as shown below:

IN THE SPECIFICATION

Column 4, line 44, delete "CL" and insert therefor --$C_L$--

IN THE CLAIMS

Claim 8, Column 9, line 42, after "comprising" insert --a--

Signed and Sealed this

Sixteenth Day of October, 2007

JON W. DUDAS
*Director of the United States Patent and Trademark Office*